US011725082B2

(12) United States Patent
Tonelli et al.

(10) Patent No.: US 11,725,082 B2
(45) Date of Patent: Aug. 15, 2023

(54) METHOD FOR DAMPING SHOCKS AND VIBRATIONS

(71) Applicants:SOLVAY SPECIALTY POLYMERS ITALY S.P.A., Bollate (IT); POLITECNICO DI MILANO, Milan (IT)

(72) Inventors: Claudio Adolfo Pietro Tonelli, Paderno d'Adda (IT); Floryan De Campo, Ixelles (BE); Antonio Mattia Grande, Brenta (IT)

(73) Assignees: SOLVAY SPECIALTY POLYMERS ITALY S.P.A., Bollate (IT); POLITECNICO DI MILANO, Milan (IT)

( * ) Notice: Subject to any disclaimer, the term of this patent is extended or adjusted under 35 U.S.C. 154(b) by 13 days.

(21) Appl. No.: 17/617,084

(22) PCT Filed: Jul. 15, 2020

(86) PCT No.: PCT/EP2020/069958
§ 371 (c)(1),
(2) Date: Dec. 7, 2021

(87) PCT Pub. No.: WO2021/009202
PCT Pub. Date: Jan. 21, 2021

(65) Prior Publication Data
US 2022/0251308 A1    Aug. 11, 2022

(30) Foreign Application Priority Data

Jul. 17, 2019  (EP) .................................... 19186857

(51) Int. Cl.
*C08G 83/00*  (2006.01)
*F16F 15/023*  (2006.01)
*F16F 15/04*  (2006.01)

(52) U.S. Cl.
CPC .......... *C08G 83/008* (2013.01); *F16F 15/023* (2013.01); *F16F 15/04* (2013.01); *F16F 2224/04* (2013.01)

(58) Field of Classification Search
None
See application file for complete search history.

(56) References Cited

U.S. PATENT DOCUMENTS

| 2003/0050387 A1 | 3/2003 | Fujisawa |
| 2014/0235816 A1 | 8/2014 | Arcella et al. |
| 2018/0051226 A1 | 2/2018 | De Patto et al. |

FOREIGN PATENT DOCUMENTS

| CN | 109206578 A | * | 1/2019 |
| CN | 109666130 A | * | 4/2019 |
| EP | 3467007 A1 | | 4/2019 |

OTHER PUBLICATIONS

Coote C.T., "Measurement of the damping properties of silicone-based elastomers over wide temperature ranges", Journal of Sound and Vibration, Mar. 22, 1972, vol. 21, Issue 2, pp. 133-147—Elsevier.

* cited by examiner

*Primary Examiner* — Melanie Torres Williams
(74) *Attorney, Agent, or Firm* — Osha Bergman Watanabe & Burton LLP (57) ABSTRACT

The invention relates to a method for attenuating vibrations and/or shocks, said method comprising providing a damper assembly which comprises a moving part and a supramolecular polymer in contact with said moving part, and exposing said moving part to said vibrations and/or shocks, wherein said supramolecular polymer is obtained by reacting: at least one first polymer [polymer (P1)] comprising a polymer chain [chain (R)] consisting of a plurality of non-ionisable recurring units [units (U)], said polymer (P1) having two chain ends (E1, E1'), each end comprising at least one ionisable acid group, and at least one second polymer [polymer (P2)] comprising a polymer chain [chain (R)] consisting of a plurality of recurring units [units (U)], said chain (R) being equal to or different from that of polymer (P1), and said polymer (P2) having two chain ends (E2, E2'), each end comprising at least one ionisable amino group.

15 Claims, 4 Drawing Sheets

METHOD FOR DAMPING SHOCKS AND VIBRATIONS

This application is a U.S. national stage entry under 35 U.S.C. § 371 of International Application No. PCT/EP2020/069958 filed Jul. 15, 2020, which claims priority to European application No. 19186857.9, filed on Jul. 17, 2019. The entire contents of these applications are explicitly incorporated herein by this reference.

TECHNICAL FIELD

The present invention relates to a method for damping shocks and vibrations.

BACKGROUND ART

Generally, damping is an influence within or upon an oscillatory system that has the effect of reducing, restricting or preventing its oscillations. This is typically obtained by dissipating the energy stored in the oscillation. Dampers, such as shock absorbers or dashpots, are devices designed to absorb and damp shock impulses by converting the kinetic energy of the shock into another form of energy (typically heat), which is then dissipated.

Dampers comprising elastomers, jells and viscous fluids (also referred to as "damping elastomers", "damping jells" and "damping fluids") are widely used in many fields. For example, dampers are mounted in skyscrapers and in other civil structures (e.g. bridges, towers, elevated freeways) for suppressing earthquake- and wind-induced vibrations, in power transmission lines, in automotive, aircrafts and spacecrafts. In the latter, dampers are employed for vibration and sound abatement in fuselage, wing and satellite components; moreover, shock absorbers are assembled in suspension systems, to absorb shocks encountered during landing and take-off while traversing uneven terrain. Also, torsional dampers are used to reduce the torsional vibrations in the crankshafts of internal combustion engines, as these vibrations can break the crankshaft itself or cause driven belts, gears and attached components to fail.

Nowadays, highly viscous silicone oils with a viscosity from 30'000 up to 2'500'000 cSt at 25° C. are widely used as damping fluids thanks to their high damping action for vibration, pulsation and amplitude of motion, their good temperature-viscosity properties and their high shear stability. Said silicone oils have a very high number average molecular weight (Mn), which ranges from about 100'000 to more than 500'000.

However, silicone oils having Mn higher than 100'000 are difficult to produce with good yield and purity. Their synthesis process requires higher temperatures and shorter reaction time than silicone oils having a lower Mn; however, under these conditions the conversion yield significantly decreases due to the intervention of secondary reactions. As a consequence, the synthesis of highly viscous silicone oils is very expensive.

In addition, the highly viscous silicone oils currently used as damping fluids suffer from some disadvantages, such as sensitivity to acids, bases and moisture and in particular thermal instability. Indeed, as a result of prolonged exposure to high temperatures (200° C. or even higher), the highly viscous silicone oils gradually harden over time, until they become inoperable and must be replaced. Still further, the thermal instability of said highly viscous silicone oils becomes more evident as the viscosity of the silicone oil increases.

Furthermore, said highly viscous silicone oils are not easily recyclable.

Silicone elastomers and silicone jells are also used as damping materials, especially in equipment where vibration causes noise or even damage. For example, Journal of Sound and Vibration (1972) 21 (2), 133-147 discloses the use of silicone elastomers in artificial damping treatments applied to aircraft panels to reduce the response to acoustic excitation. However, their damping properties are limited by the intrinsic nature of the polymeric backbone. In addition, said silicone jells and silicone elastomers are also difficult to recycle.

Need is therefore felt to provide materials intended for use in several damping applications, which are provided with high damping properties and which can be prepared via a simple and fast synthesis process.

SUMMARY OF INVENTION

In a first aspect, the present invention relates to a method for attenuating vibrations and/or shocks, said method comprising:

providing a damper assembly, said damper assembly comprising at least one moving part and at least one supramolecular polymer in contact with said at least one moving part, said supramolecular polymer being obtained by reacting:
  a) at least one first polymer [polymer (P1)] comprising a polymer chain [chain (R)] consisting of a plurality of non-ionisable recurring units [units (U)], said polymer (P1) having two chain ends (E1, E1'), each end comprising at least one ionisable acid group;
  b) at least one second polymer [polymer (P2)] comprising a polymer chain [chain (R)] consisting of a plurality of recurring units [units (U)], said chain (R) being equal to or different from that of polymer (P1), and said polymer (P2) having two chain ends (E2, E2'), each end comprising at least one ionisable amino group, preferably the chain (R) of said polymers (P1) and (P2) being independently selected from a fully or partially fluorinated polyoxyalkylene chain, a polyalkylsiloxane chain, a polyoxyalkylene chain, a polycarbonate chain, a polyester chain and a polybutadiene chain, and exposing said at least one moving part to said vibrations and/or shocks, so as to attenuate the same.

In a second aspect, the present invention relates to a damper assembly comprising at least one moving part and at least one supramolecular polymer, as defined above, which is in contact with said at least one moving part.

The Applicant has surprisingly found that the above identified supramolecular polymer has high damping properties. In particular, the Applicant has surprisingly found that a supramolecular polymer obtained by reacting at least one polymer (P1) and at least one polymer (P2) with a given chain (R) and a given molecular weight has significantly increased damping properties when compared to polymers having chains of similar nature and having similar (or even higher) molecular weights to polymers (P1) and (P2), but which are not ionically interconnected to form a supramolecular polymer. Ultimately, the Applicant has interestingly found that improved damping properties can be obtained starting from polymers (P1) and (P2) which have significantly lower molecular weights than the damping fluids known in the art and, therefore, are much easier to synthesize.

The Applicant has also interestingly found that the damping properties of the above identified supramolecular polymer can be easily tuned by varying the chemical structure of the chain (R) of the polymers (P1) and (P2), their molecular weight and the molar ratio between said polymers (P1) and (P2). In addition, the Applicant has surprisingly found that the damping properties of the above identified supramolecular polymer can be easily tuned from elastic material to viscous fluid by varying the molecular weight and the stoichiometry of the polymers (P1) and (P2), but not the chemical structure of the chain (R).

DETAILED DESCRIPTION OF THE INVENTION

In the present description, unless otherwise indicated, the following terms are to be meant as follows.

The expression "supramolecular polymer" is intended to denote a structure consisting of polymeric units held together by ionic interactions.

The expressions "ionisable amino groups" and "ionisable acid groups" identify amino or acid groups able to form ionic groups, namely cationic and anionic groups respectively. In greater detail, an ionisable amino group identifies a primary, secondary or tertiary amino group, while an ionisable acid group identifies an acid group comprising at least one hydroxyl function in its protonated form, i.e. a protic acid group.

A "hydrocarbon group" is a radical derived from a hydrocarbon by removal of one or more atoms of hydrogen from carbon atoms; a hydrocarbon group thus comprises one or more ends able to form a linkage with another chemical group.

An "alicyclic group" is an aliphatic cyclic group consisting of one or more all-carbon rings which may be either saturated or unsaturated.

The adjective "aromatic" denotes any mono- or polynuclear cyclic group (or moiety) having a number of π electrons equal to 4n+2, wherein n is 0 or any positive integer; an aromatic group (or moiety) can be an aryl or an arylene group (or moiety).

An "aromatic group" consists of one core composed of one benzenic ring or of a plurality of benzenic rings fused together by sharing two or more neighboring ring carbon atoms. Non limitative examples are benzene, naphthalene, anthracene, phenanthrene, tetracene, triphenylene, pyrene, perylene.

Alicyclic and aromatic groups can be substituted with one or more straight or branched alkyl or alkoxy groups and/or halogen atoms and/or can comprise one or more heteroatoms, like nitrogen, oxygen and sulfur, in the ring.

$M_n$ refers to the number average molecular weight.

G' refers to the storage modulus, which is the measurement of the stored energy and represents the elastic portion of the polymeric material.

G" refers to the loss modulus, which is the measurement of the energy dissipated as heat and represents the viscous portion of the polymeric material.

Tan(δ), also referred to as tangent delta, is the ratio between G" and G' and gives the measure of the viscous portion to the elastic portion of the polymeric material.

$W_d$ refers to the dissipated energy per cycle.

η* refers to the complex viscosity, which is the frequency-dependent viscosity function determined during forced harmonic oscillation of shear stress.

The use of parentheses "( . . . )" before and after the names of compounds, symbols or numbers identifying formulae or parts of formulae like, for example "polymer (P1)", has the mere purpose of better distinguishing those names, symbols or numbers from the remaining text; thus, said parentheses could also be omitted.

When ranges are indicated, range ends are included.

As said, the method according to the present invention comprises providing a damper assembly comprising at least one moving part and at least one supramolecular polymer which is in contact with said moving part, and exposing said at least one moving part to said vibrations and/or shocks, so as to attenuate the same. As said, the supramolecular polymer is obtained by reacting at least one first polymer [polymer (P1)] comprising a polymer chain [chain (R)] consisting of a plurality of non-ionisable recurring units [units (U)], and having two chain ends (E1, E1') each comprising at least one ionisable acid group, and at least one second polymer [polymer (P2)] comprising a polymer chain [chain (R)] consisting of a plurality of recurring units [units (U)], and having two chain ends (E2, E2') each comprising at least one ionisable amino group.

Preferably, polymer (P1) and polymer (P2) are amorphous and have a $T_g$ lower than −35° C., preferably from −35° C. to −120° C., and the ratio between the equivalents of polymer (P1) and the equivalents of polymer (P2) preferably ranges from 1.4 to 0.6, more preferably from 1.2 to 0.8, even more preferably from 1.1 to 0.9.

Polymer (P1)

Polymer (P1) can be represented with formula (P1) here below:

$$E1-R-E1' \quad (P1)$$

wherein R is a polymer chain, as defined above, and E1 and E1', equal to or different from one another, are end groups each comprising at least one ionisable acid group.

Chain Ends E1 and E1'

Chain ends E1 and E1' of polymer (P1) preferably comprise at least one ionisable acid group selected among carboxylic acid groups, phosphonic acid groups and sulfonic acid groups. Each of said ionisable acid groups is able to form an anionic group via acid/base reaction with the at least one ionisable amino group at one end of polymer (P2).

Preferably, groups E1 and E1' are equal to one another.

Preferably, groups E1 and E1' comply with formula (E1-A) here below:

$$-B1-(E_A)_m \qquad (E1\text{-}A)$$

wherein:

$E_A$ represents a —COOH, a —P(O)(OR$_{EA}$)$_2$ or a —S(O)$_2$OH group, wherein one of R$_{EA}$ is hydrogen and the other one is hydrogen or straight or branched alkyl, preferably $C_1$-$C_4$ alkyl;

m is a positive number equal to or higher than 1, m being preferably 2; B1 is a hydrocarbon group preferably comprising from 1 to 20 carbon atoms and possibly comprising one or more than one heteroatom, said heteroatom(s) being preferably selected among N, S and O.

Preferably, B1 comprises at least one cyclic hydrocarbon group, which may be selected from: alicyclic groups, aromatic groups, heterocyclic groups comprising one or more than one heteroatom, and heteroaromatic groups comprising one or more than one heteroatom, said one or more than one heteroatom being preferably selected from N, S and O. Said at least one cyclic hydrocarbon group may comprise one or more substituents. In case B1 comprises more than one cyclic group, i.e. at least two cyclic groups, said cyclic groups may be condensed or may be connected through a bond or through any (hydro)carbon divalent group optionally comprising one or more than one heteroatom, said heteroatom(s) being preferably selected from N, S and O.

Preferably, B1 comprises one or more of the groups selected from: —O—, —S—, —OC(O)O—, —OC(O)NH—, —NH—C(O)—, OC(O)S—, —SC(O)S—, —NHC(O)NH—, —NH—C(=S) and —NHC(S)NH—.

Chain (R)

As said, chain (R) is independently selected from a fully or partially fluorinated polyoxyalkylene chain, a polyalkylsiloxane chain, a polyoxyalkylene chain, a polycarbonate chain, a polyester chain and a polybutdiene chain. Preferably, said chain (R) is selected from a fully or partially fluorinated polyoxyalkylene chain, a polyalkylsiloxane chain and a polyoxyalkylene chain.

Polyalkylsiloxane Chain (R$_S$)

According to an embodiment, said chain (R) is a polyalkylsiloxane chain [chain (R$_S$)] comprising, preferably consisting of, recurring units [units (U$_S$)], equal to or different from each other, of formula:

(U$_s$)

wherein Ra$_s$ and Rb$_s$, equal to or different from one another, are independently selected from hydrogen, straight or branched (halo)alkyl and aryl, with the proviso that at least one of Ra$_s$ and Rb$_s$ is not hydrogen, Ra$_s$ and Rb$_s$ being preferably straight or branched alkyl groups comprising from 1 to 4 carbon atoms, Ra$_s$ and Rb$_s$ being preferably methyl groups.

In a preferred embodiment, said chain (R$_S$) has formula (R$_S$-I) here below:

$$\text{Si(CH}_3)_2\text{O[Si(CH}_3)_2\text{O]}_{ns}\text{Si(CH}_3)_2 \qquad (R_S\text{-I})$$

with ns being a positive number selected in such a way that the $M_n$ of the [Si(CH$_3$)$_2$O]$_{ns}$ chain preferably ranges from 500 to 50'000, more preferably from 500 to 30'000.

Minor amounts (e.g. <1% (wt), based on the weight of chain (R$_S$-I)) of spurious units, defects or recurring unit impurities may be comprised in chain (R$_S$-I) without this affecting chemical properties of the chain.

According to a preferred embodiment, polymer (P1) complies with the following formula (P$_S$1-A) here below:

$$R_S\text{—[(CH}_2)_{ns*}\text{NHC(O)—}R_{B1}\text{—(COOH)}_2]_2 \qquad (P_S1\text{-A})$$

wherein R$_S$ has formula (R$_S$-I) above, ns* is 0 or a positive number equal to or higher than 1, preferably ranging from 1 to 10, more preferably ranging from 2 to 5, and R$_{B1}$ is a C$_1$-C$_{10}$ straight or branched aliphatic group, a C$_4$-C$_6$ alicyclic group or heterocyclic group, a C$_5$-C$_6$ aromatic group or heteroaromatic group.

Preferably, R$_{B1}$ is an aromatic group. More preferably, R$_{B1}$ is a C$_6$ aromatic group. According to various embodiments, each —COOH group may be in ortho, meta, para positions with respect to —NHC(O)—. According to various embodiments, each —COOH group may be in ortho, meta, para positions with respect to each other.

Polyoxyalkylene Chain (R$_{OA}$)

According to an embodiment, said chain (R) is a polyoxyalkylene chain [chain (R$_{OA}$)] comprising, preferably consisting of, recurring units [units (U$_{OA}$)], equal to or different from each other, of formula:

$$-\text{OR*}_{OA}- \qquad (U_{OA})$$

wherein R*$_{OA}$ is a straight or branched alkylene divalent group.

Said chain (R$_{OA}$) has a $M_n$ preferably ranging from 500 to 10,000, more preferably from 500 to 5,000.

Preferably, said chain (R$_{OA}$) comprises, preferably essentially consists of, oxypropylene or oxytetramethylene recurring units or a mixture thereof. Accordingly, in formula (U$_{OA}$), each R*$_{OA}$, equal to or different from each other, is independently selected among propylene groups of formulae (R*$_{OA}$-i)-(R*$_{OA}$-ii) and a tetramethylene group of formula (R*$_{OA}$-iv):

$$-\text{CH}_2\text{CH}_2\text{CH}_2- \qquad (R*_{OA}\text{-i})$$

$$-\text{CH}_2\text{CH(CH}_3)- \qquad (R*_{OA}\text{-ii})$$

$$-\text{CH(CH}_3)\text{CH}_2- \qquad (R*_{OA}\text{-iii})$$

$$-\text{CH}_2\text{CH}_2\text{CH}_2\text{CH}_2- \qquad (R*_{OA}\text{-iv})$$

Minor amounts (i.e. <1% in moles) of groups R*$_{OA}$ other than those specified may be present as impurities, defects or spurious components without this affecting chemical properties of the chain (R$_{OA}$).

In a preferred embodiment, said chain (R$_{OA}$) is a polyoxypropylene chain and each R*$_{OA}$ is independently selected among propylene groups of formulae (R*$_{OA}$-i)-(R*$_{OA}$-iii) above.

In another preferred embodiment, said chain (R$_{OA}$) is a polytetramethylene glicole chain and each R*$_{OA}$ is a tetramethylene group of formula (R*$_{OA}$-iv) above.

According to a preferred embodiment, polymer (P1) complies with the following formula ($P_{OA}1$-A):

$$(HOOC)_2R_{B1}—(OR^*_{OA})_{n^*_{OA}}—O—R_{B1}(COOH)_2 \quad (P_{OA}1\text{-A})$$

wherein $R_{B1}$ and $R^*_{OA}$ are as defined above, and $n^*_{OA}$ is a positive number selected in such a way that the $M_n$ of the chain ($R_{OA}$) preferably ranges from 500 to 10'000, more preferably from 500 to 5'000; $R^*_{OA}$ is as defined above.

According to another preferred embodiment, polymer (P1) complies with the following formula ($P_{OA}1$-B):

$$(HOOC)_2R_{B1}—C(O)—(OR^*_{OA})_{n^*_{OA}}—O—C(O)—R_{B1}(COOH)_2 \quad (P_{OA}1\text{-B})$$

wherein $R_{B1}$, $n^*_{OA}$ and $R^*_{OA}$ are as defined above with respect to polymer ($P_{OA}1$-A).

In the above formulae ($P_{OA}1$-A) and ($P_{OA}1$-B), $R_{B1}$ is preferably an aromatic group. More preferably, $R_{B1}$ is a C6 aromatic group. According to various embodiments, each —COOH group may be in ortho, meta, para positions with respect to —C(O)—. According to various embodiments, each —COOH group may be in ortho, meta, para positions with respect to each other.

Fully or Partially Fluorinated Polyoxyalkylene Chain ($R_F$)

According to an embodiment, said chain (R) is a fully or partially fluorinated polyoxyalkylene chain [chain ($R_F$)] comprising, preferably consisting of, recurring units [units ($U_F$)], equal to or different from each other, having at least one catenary ether bond and at least one fluorocarbon moiety.

Preferably, said chain ($R_F$) comprises units ($U_F$) selected among:
- ($U_F$-i) —CFXO—, wherein X is F or $CF_3$;
- ($U_F$-ii) —CFXCFXO—, wherein X, equal or different at each occurrence, is F or $CF_3$, with the proviso that at least one of X is —F;
- ($U_F$-iii) —$CF_2CF_2CW_2O$—, wherein each of W, equal or different from each other, is F, Cl, H,
- ($U_F$-iv) —$CF_2CF_2CF_2CF_2O$—;
- ($U_F$-v) —$(CF_2)_j$—CFZ—O— wherein j is an integer from 0 to 3 and Z is a group of general formula —$OR_f^*T$, wherein $R_f^*$ is a fluoropolyoxyalkene chain comprising a number of repeating units from 0 to 10, said recurring units being chosen among the followings: —$CFX^*O$—, —$CF_2CFX^*O$—, —$CF_2CF_2CF_2O$—, —$CF_2CF_2CF_2CF_2O$—, with each of each of $X^*$ being independently F or $CF_3$ and T being a $C_1$-$C_3$ perfluoroalkyl group.

When units ($U_F$) are different from one another, they are randomly distributed along the chain.

Preferably, said chain ($R_F$) has formula ($R_F$-I):

$$—(CFX_1O)_{g1}(CFX_2CFX_3O)_{g2}(CF_2CF_2CF_2O)_{g3}(CF_2CF_2CF_2CF_2O)_{g4}— \quad (R_F\text{-I})$$

wherein:
- $X_1$ is independently selected from —F and —$CF_3$;
- $X_2$, $X_3$, equal or different from each other and at each occurrence, are independently —F, —$CF_3$, with the proviso that at least one of X is —F;
- g1, g2, g3, and g4, equal or different from each other, are independently integers≥0, selected in such a way that the $M_n$ ranges from 400 to 10'000; should at least two of g1, g2, g3 and g4 be different from zero, the different recurring units are generally statistically distributed along the chain.

More preferably, said chain ($R_F$) is selected from chains of formulae ($R_F$-IA)-($R_F$-IE) here below:

$$—(CF_2CF_2O)_{a1}(CF_2O)_{a2}— \quad (R_F\text{-IA})$$

wherein:
- a1 and a2 are independently integers≥0 such that the $M_n$ ranges from 400 to 10'000, preferably from 400 to 5'000, more preferably from 400 to 4'000; both a1 and a2 are preferably different from zero, with the ratio a1/a2 preferably ranging from 0.1 to 10, preferably ranging from 0.2 to 5;

$$—(CF_2CF_2O)_{b1}(CF_2O)_{b2}(CF(CF_3)O)_{b3}(CF_2CF(CF_3)O)_{b4}— \quad (R_F\text{-IB})$$

wherein:
- b1, b2, b3, b4, are independently integers≥0 such that the $M_n$ ranges from 400 to 10'000, preferably from 400 to 5'000; preferably b1 is 0, b2, b3, b4 are >0, with the ratio b4/(b2+b3) being≥1;

$$—(CF_2CF_2O)_{c1}(CF_2O)_{c2}(CF_2(CF_2)_{cw}CF_2O)_{c3}— \quad (R_F\text{-IC})$$

wherein:
- cw=1 or 2;
- c1, c2, and c3 are independently integers≥0 such that the $M_n$ ranges from 400 to 10'000, preferably from 400 to 5'000; preferably c1, c2 and c3 are all>0, with the ratio c3/(c1+c2) being generally lower than 0.2;

$$—(CF_2CF(CF_3)O)_d— \quad (R_F\text{-ID})$$

wherein:
- d is an integer>0 such that the $M_n$ ranges from 400 to 10'000, preferably from 400 to 5'000;

$$—(CF_2CF_2C(Hal)_2O)_{e1}—(CF_2CF_2CH_2O)_{e2}—(CF_2CF_2CH(Hal)O)_{e3}— \quad (R_F\text{-IE})$$

wherein:
- Hal, equal or different at each occurrence, is a halogen selected from fluorine and chlorine atoms, preferably a fluorine atom;
- e1, e2, and e3, equal to or different from each other, are independently integers≥0 selected in such a way that the such that the (e1+e2+e3) $M_n$ ranges from 400 to 10'000.

According to preferred embodiments, polymer (P1) is selected from a polymer complying with any of the following formulae ($P_F1$-A) to ($P_F1$-C):

$$(R_F\text{-I})\text{-}[CFXCH_2(OCH_2CH_2)_{nD}OCH_2COOH]_2 \quad (P_F1\text{-A})$$

$$(R_F\text{-I})\text{-}[CFXCH_2(OCH_2CH_2)_{nD}OC(O)—R_{B1}—COOH]_2 \quad (P_F1\text{-B})$$

$$(R_F\text{-I})\text{-}[CFXCH_2(OCH_2CH_2)_{nD}NHC(O)—R_{B1}—COOH]_2 \quad (P_F1\text{-C})$$

wherein:
- nD is 0 or an integer≥1,
- $R_{B1}$ is a $C_1$-$C_{10}$ straight or branched aliphatic group, a $C_4$-$C_6$ alicyclic group or heterocyclic group, a $C_5$-$C_6$ aromatic group or heteroaromatic group, optionally comprising one or more —COOH groups, and X is as defined above.

POLYMER (P2)

Polymer (P2) can be represented with formula (P2) here below:

$$E2\text{-}R\text{-}E2' \quad (P2)$$

wherein R is a polymer chain, as defined above, and E2 and E2', equal to or different from one another, are end groups each comprising at least one ionisable amino group.

Chain Ends E2 and E2'

Chain ends E2 and E2' preferably comprise at least one ionisable amino group selected among primary, secondary or tertiary amino groups. "Ionisable primary, secondary or tertiary amino group" means that the amino group is in its free form, so that it is capable to form a cationic group via acid/base reaction with the at least one acid group at one end of the polymer (P1).

Preferably, groups E2 and E2' are equal to one another.

Preferably, groups E2 and E2' comply with formula (E2-A) here below:

-B2-(N(R$_{P2}$)$_2$)$_p$                                                      (E2-A)

wherein:

each of $R_{P2}$, equal to or different from each other at each occurrence, is hydrogen or straight or branched alkyl, preferably $C_1$-$C_4$ alkyl; p is a positive number equal to or higher than 1, p being preferably 1 or 2; B2 is a hydrocarbon group preferably comprising from 1 to 20 carbon atoms and optionally comprising one or more than one heteroatom, said heteroatom(s) being preferably selected among N, S and O.

B2 optionally comprises one or more than one cyclic hydrocarbon group, which may be alicyclic group(s), aromatic group(s), heterocyclic group(s) comprising one or more than one heteroatom, and heteroaromatic group(s) comprising one or more than one heteroatom, the heteroatom(s) being preferably selected from N, S and O. Each of said cyclic hydrocarbon groups may comprise one or more substituents. In case B2 comprises more than one cyclic group, i.e. at least two cyclic groups, said cyclic groups may be condensed or may be connected through a bond or through any (hydro)carbon divalent group possibly comprising one or more than one heteroatom, said heteroatom(s) being preferably selected from N, S and O.

B2 optionally comprises one or more than one group selected from the following: —O—, —S—, —OC(O)O—, —OC(O)NH—, —NH—C(O)—, OC(O)S—, —SC(O)S—, —NHC(O)NH—, —NHC(S)NH—, —N($R_{P2*}$)— wherein $R_{P2*}$ represents hydrogen or straight or branched alkyl, preferably $C_1$-$C_4$ alkyl, more preferably methyl.

Chain (R)

Chain (R) is as defined above for polymer (P1).

According to an embodiment, polymer (P2) complies with the following formula ($P_S$2-A) here below:

$R_S$—[(CH$_2$)$_{ns*}$NH—$R_{B2}$—(N($R_{P2}$)$_2$)$_2$]$_2$                   ($P_S$2-A)

wherein $R_S$ has formula ($R_S$-1) above; ns* is 0 or a positive number equal to or higher than 1, preferably ranging from 1 to 10, more preferably ranging from 2 to 5; $R_{P2}$ is as defined above, preferably being hydrogen, and $R_{B2}$ is a $C_1$-$C_{10}$ straight or branched aliphatic group, a $C_4$-$C_6$ alicyclic group or heterocyclic group, a $C_5$-$C_6$ aromatic group or heteroaromatic group. Preferably, $R_{B2}$ is a heteroaromatic group. More preferably, $R_{B2}$ is a $C_6$ heteroaromatic group. Even more preferably, $R_{B2}$ is a triazine. Still more preferably, $R_{B2}$ is a 1,3,5-triazine.

According to another embodiment, polymer (P2) complies with the following formula ($P_S$2-B) here below:

$R_S$—[(CH$_2$)$_{ns}^\#$—NH$_2$]$_2$                                                       ($P_S$2-B)

wherein $ns^\#$ is a positive number from 1 to 20, preferably from 1 to 10, and $R_S$ is a chain of formula ($R_S$-I) above.

Yet, according to an embodiment, polymer (P2) complies with the following formula ($P_{OA}$2-A):

(($R_{P2}$)$_2$N)$_2$$R_{B2}$—(OR*$_{OA}$)$_{n*OA}$—R*$_{OA}$—$R_{B2}$(N($R_{P2}$)$_2$)$_2$                    ($P_{OA}$2-A)

wherein $R_{B2}$ is a $C_1$-$C_{10}$ straight or branched aliphatic group, a $C_4$-$C_6$ alicyclic group or heterocyclic group, a $C_5$-$C_6$ aromatic group or heteroaromatic group; $n*_{OA}$ is a positive number selected in such a way that the $M_n$ of the chain $R_{OA}$ preferably ranges from 500 to 10'000, more preferably from 500 to 5'000; $R*_{OA}$ and $R_{P2}$ are as defined above.

According to a further embodiment, polymer (P2) complies with the following formula ($P_{OA}$2-B):

(($R_{P2}$)$_2$N)$_2$$R_{B2}$—NH—(OR*$_{OA}$)$_{n*OA}$—R*$_{OA}$—NH—$R_{B2}$(N($R_{P2}$)$_2$)$_2$                        ($P_{OA}$2-B)

wherein $R_{B2}$, $n*_{OA}$, $R*_{OA}$, $R_{P2}$ are as defined above with respect to polymer ($P_{OA}$2-A).

In the above formulae ($P_{OA}$2-A) and ($P_{OA}$2-B), $R_{B2}$ is preferably a heteroaromatic group. More preferably, $R_{B2}$ is a $C_6$ heteroaromatic group. Even more preferably, $R_{B2}$ is a triazine. Still more preferably, $R_{B2}$ is a 1,3,5-triazine.

Yet, according to further embodiments, polymer (P2) is selected from a polymer complying with any of the following formulae ($P_F$2-A) to ($P_F$2-D):

($R_F$-I)-[CFXCH$_2$(OCH$_2$CH$_2$)$_{nD}$N($R_{P2}$)$_2$]$_2$                               ($P_F$2-A)

($R_F$-I)-[CFXCH$_2$(OCH$_2$CH$_2$)$_{nD}$NH—$R_{B2}$—N($R_{P2}$)$_2$]$_2$                ($P_F$2-B)

($R_F$-I)-[CFXCH$_2$(OCH$_2$CH$_2$)$_{nD}$OC(O)—$R_{B2}$—N($R_{P2}$)$_2$]$_2$               ($P_F$2-C)

($R_F$-I)-[CFXCH$_2$(OCH$_2$CH$_2$)$_{nD}$OC(O)NH—$R_{B2}$NHC(O)OR$_{B3}$—N($R_{P2}$)$_2$]$_2$          ($P_F$2-D)

wherein:

nD is 0 or an integer≥1, $R_{B2}$ is a $C_1$-$C_{10}$ straight or branched aliphatic group, a $C_4$-$C_6$ alicyclic group or heterocyclic group, a $C_5$-$C_6$ aromatic group or heteroaromatic group, $R_{B3}$ is a $C_2$-$C_{10}$ straight or branched aliphatic group, optionally interrupted by one or more —N($R_{P2*}$)— groups wherein $R_{P2*}$ represents hydrogen or straight or branched alkyl, $R_{P2}$ is hydrogen or straight or branched alkyl, and X is as defined above.

Supramolecular Polymer

The supramolecular polymer can be prepared by mixing polymer (P1) and polymer (P2) according to conventional mixing techniques at an equivalent ratio between polymer (P1) and polymer (P2) ranging from 1.4 to 0.6, preferably from 1.2 to 0.8, more preferably from 1.1 to 0.9. Mixing can be carried out with or without solvents, using appropriate mixing equipment. For the avoidance of doubt, the ratio between the equivalents of polymer (P1) and the equivalents of polymer (P2) is referred to the acid/base reaction between the at least one ionisable acid group in each end group of polymer (P1) and the at least one ionisable amino group in each end of polymer (P2).

One or more polymers (P1) can be used in the manufacture of the supramolecular polymer. "More polymers" means that polymers (P1) can be used which differ from one another in the kind of recurring units (U) of the chain (R), in the kind of end groups (E1) and (E1') or in both of them, or in the number average molecular weight.

One or more polymers (P2) can also be used in the manufacture of the supramolecular polymer. "More polymers" means that polymers (P2) can be used which differ from one another in the kind of recurring units (U) of the chain (R), in the kind of end groups (E2) and (E2') or in both of them, or in the number average molecular weight.

According to a preferred embodiment, one polymer (P1) and one polymer (P2) are used in the manufacture of the supramolecular polymer; the chain (R) of polymer (P1) can be equal to or different from the chain (R) of polymer (P2). In an embodiment, said polymer (P1) has four ionisable acidic end groups and said polymer (P2) has two ionisable amino end groups. In another embodiment, said polymer (P1) has four ionisable acidic end groups and said polymer (P2) has four ionisable amino end groups.

According to another preferred embodiment, one polymer (P1) and two polymers (P2) are used in the manufacture of the supramolecular polymer; also in this case, the chain (R) of polymer (P1) can be equal to or different from the chains (R) of polymers (P2).

It is further understood that polymer(s) (P1) and polymer(s) (P2) may have polymer chains consisting of same recurring units (U) or may have polymer chains differing for nature of units (U) and/or molecular weight and/or any other structural feature.

Without being bound to theory, it is believed that, when a polymer (P1) and a polymer (P2) are mixed in the above equivalent ratio, the ionisable acid group(s) at each end of polymer (P1) undergo(es) acid/base reaction with the ionisable amino group(s) at each end of polymer (P2).

Said supramolecular polymer can be used either alone or in admixture with suitable additional ingredients. Said additional ingredients are preferably selected among organic and inorganic fillers. Said inorganic fillers include notably silicate compounds (e.g. metal silicate, such as aluminium silicate), titanium dioxide, alumina, silica, zeolites, mica, talc, kaolin, chalk, carbon fibers, carbon nano-tubes, glass fibers, calcium carbonate, potassium titanate, metal sulfates (e.g. barium sulfate, calcium sulfate, strontium sulfate). Said organic fillers notably include cellulose and other polymers, preferably polymers having a higher Tg (e.g. aromatic polycondensates, such as polyamides and polysulfones).

Damper Assembly

Advantageously, said supramolecular polymer is used as damping material in a damper assembly that is used in applications wherein high pressures, high work-loads and high temperatures are involved. However, the skilled person will easily understand that the use of said supramolecular polymer at moderate or low work-loads and/or temperature and/or pressure may also be advantageous.

A damper assembly is intended to attenuate vibrations and/or shocks by converting the kinetic energy of the moving part(s) into another form of energy—typically heat—which is then dissipated.

As said, the damper assembly comprises at least one moving part and at least one supramolecular polymer as defined above which is contact with said at least one moving part.

According to a first embodiment of the invention, said damper assembly comprises a chamber which contains said supramolecular polymer and within which the moving part is slidably enclosed. Advantageously, said supramolecular polymer belongs to the class of viscous fluids or elastic jells. For example, said chamber is a cylinder, said moving part is a piston and said piston is immersed in said supramolecular polymer. According to this embodiment, any force that acts on the piston or any impact that is directed to the piston actuates the piston movement into the supramolecular polymer, and this movement of the piston dissipates such force or impact. In other words, any vibration and/or shock to which the piston is exposed is attenuated or absorbed by the supramolecular polymer itself.

According to a second embodiment of the invention, said damper assembly comprises a damping gasket (or damping seal) at least partially made from said supramolecular polymer, which is in contact with said at least one moving part. In a particular embodiment, said damping gasket is sandwiched between two moving parts. Advantageously, said supramolecular polymer belongs to the class of elastic solids, for instance elastomers. Advantageously, said at least one moving part is a rigid structure, more preferably a composite- or metal-based structure.

According to this embodiment, said rigid structure moves upon exposure to vibrations and/or shocks, which are attenuated by the supramolecular polymer which deforms, accordingly.

Preferably, the damper assembly is selected in the group comprising dashpots; shock absorbers such as twin-tube or mono-tube shocks absorbers, positive sensitive damping (PSD) shock absorbers, acceleration sensitive damping (ASD); rotary dampers; tuned mass dampers; viscous couplings; viscous fan clutches and torsional viscous dampers.

Typical apparatuses comprising damper assemblies as defined above are selected in the group comprising: mechanical or electric device for wheeled vehicles (such as suspensions installations, carburettors, internal combustion devices, engines, transmissions, crankshafts), for work boats (such as engines), for aircrafts and spacecraft (such as aircraft carrier decks), for power transmission lines, for wind turbine, for consumer electronics (such as mobile phones and personal computers), for off-shore rig, for oil & gas distribution systems (such as pumps); compressors (such as reciprocating compressors for gas pipelines); devices for buildings and civil structures (such as bridges, towers, elevated freeways).

The invention is described in greater detail in the following experimental section by means of non-limiting examples.

Experimental Section

Materials

Trimellitic anhydride, 2-chloro-4,6-diamino-1,3,5 triazine, potassium hydrogen carbonate, methanesulfonyl chloride, 1,4-dioxane, 2-propanol (IPA), t-butylmethyl ether (TBME), toluene, dichloromethane, acetone, hexafluoroxylene (HFX), ethylene diamine were purchased from Aldrich® and used as received.

Polymers (P2F) of formula:

$$NH_2-(CH_2)_{ns}-Rs-(CH_2)_{ns}-NH_2$$

with Rs being a poly(dimethylsiloxane) chain, ns=3 and Mn=3000

[herein after (P2F-1)], Mn=5000 [herein after (P2F-2)], Mn=27000

[herein after (P2F-3)] were obtained from Gelest®.

Poly(propyleneglycol) (Mn 2000) [herein after (PPG-diol) (Mn 2000)] was purchased from Aldrich® and was used as received.

Poly(propyleneglycol) (Mn 4000) [herein after (PPG-diol) (Mn 4000)] was purchased from Aldrich® and was used as received.

Poly(propyleneglycol)-bis(2-aminopropylether) (Mn 2000) [herein after (PPG-diamine)] was purchased from Aldrich® and was used as received.

It is a low viscous liquid characterized by a $T_g$ of −70° C., it contains two amine groups per molecule, and complies with formula:

with n being an integer so as to provide for the Mn as detailed above. It was used for the synthesis of PPG-based products.

Fomblin® YR:
$CF_3$—[$(OC(CF_3)FCF_2)_m$—$(OCF_2)_n$]$OCF_3$ (m+n=40; m/n=20; $M_n$ 6400), Fomblin® ZDOL PFPE:
$HOCH_2CF_2O(CF_2CF_2O)_{a1}(CF_2O)_{a2}CF_2CH_2OH$ (a1/a2=1.2; $M_n$ 1500), and Fomblin ZDOL TX® PFPE:
$HO(CH_2CH_2O)_{nD}CH_2CF_2O(CF_2CF_2O)_{a1}(CF_2O)_{a2}CF_2CH_2(OCH_2CH_2)_{nD}OH$ (nD=1.5; $M_n$ 2000)
are available from Solvay Specialty Polymers.

PDMS Alpa LSR 1302901 A/B is a silicone elastomer and was purchased from CHT.

SilGel® 612 A/B is a silicone gel and was purchased from Wacker.

Trimethylsiloxy terminated polydimethylsiloxanes with viscosities of 30,000 cSt (Mn 91'700), 300'000 cSt (Mn 204'000) and 2.5 million cSt (Mn 423'000) at 25° C. are ultra-high viscosity linear silicone fluids and were purchased from Gelest®.

Methods

Preparation of Samples

All samples were prepared by mixing polymers (P1) and (P2) at an equivalent ratio of 1 [i.e. nr acidic groups of polymer (P1)=nr basic groups of polymer (P2)].

In a typical procedure, the polymer (P1) and polymer (P2) were individually dissolved in a suitable solvent (1-99 wt % for instance in tert-Butyl methyl ether or ethyl acetate or dichloromethane) and then mixed together in a reactor equipped with a mechanical stirrer at room temperature (30° C.). The mixture was kept at room temperature (25° C.) for 12 hours, after that the solvent was removed at 70° C. under reduced pressure (0.001 torr).

Rheological Properties

Tan(δ), complex viscosity (η*) and loss modulus (G") were determined at 1 Hz in a temperature range from 25° C. to 100° C. with a laboratory oscillatory shear rheometer "TA Instruments AR 2000ex". Said rheometer was equipped with a temperature controlled test chamber and a 25 mm parallel plate geometry was employed for all the measurements.

Dissipated energy per cycle ($W_d$) was determined as $W_d=\pi\gamma_0 G''$, where $\gamma_0$ is the applied deformation (1% shear strain) and G" is determined as above.

$^{13}C$ and $^1H$ NMR

NMR analyses were performed on a Bruker Avance™ 400 MHz spectrometer with a 5 mm probe and the obtained spectra were processed using Bruker's TopSpin™ software (3.2 ver.).

The polymer structures were determined by $^1H$ or $^{13}C$ NMR analyses. The number average molecular weight ($M_n$) of the polymers (P1) and (P2) were estimated by polymer end group analysis (using $^1H$ NMR spectra).

SYNTHESIS EXAMPLES

Example 1—Synthesis of a Polymer (P1A) of Formula wherein Rs is a poly(dimethylsiloxane) chain, Mn 3444 [herein after (P1A)].

A glass reactor was charged with polymer P2F-1 (100 g, 33.33 mmol, Mn 3000) and dried under vacuum for two hours under mechanical stirring at 70° C. 1,4-dioxane (100 ml) and trimellitic anhydride (15.95 g, 83 mmol) were added to the reactor and stirred at 100° C. for 18 hours. The reaction completion was monitored by $^1H$-NMR. The NMR analyses confirmed the obtainment of title product, with purity higher than 99%.

Example 2—Synthesis of a Polymer (P1B) of Formula wherein Rs is a poly(dimethylsiloxane) chain, Mn 6256 [herein after (P1B)].

A glass reactor was charged with polymer P2F-2 (100 g, 20 mmol, Mn 5000) and dried under vacuum for two hours under mechanical stirring at 70° C. 1,4-dioxane (100 ml) and trimellitic anhydride (9.606 g, 50 mmol) were added to the reactor and stirred at 100° C. for 24 hours. The reaction completion was monitored by $^1H$-NMR. The NMR analyses confirmed the obtainment of title product, with purity higher than 99%.

Example 3—Synthesis of a Polymer (P1C) of Formula wherein Rs is a poly(dimethylsiloxane) chain, Mn 27300 [herein after (P1C)].

A glass reactor was charged with polymer P2F-3 (100 g, 3.7 mmol, Mn 27000) and dried under vacuum for two hours under mechanical stirring at 70° C. 1,4-dioxane (100 ml) and trimellitic anhydride (1.9 g, 10 mmol) were added to the reactor and stirred at 100° C. for 24 hours. The reaction completion was monitored by $^1H$-NMR. The NMR analyses confirmed the obtainment of title product, with purity higher than 99%.

Example 4—Synthesis of a Polymer (P1D) of Formula with Mn 2470 [herein after (P1 D)].

A glass reactor was charged with trimellitic anhydride (144.1 g, 750 mmol) dissolved in dehydrated DMF (100 ml) under nitrogen atmosphere. Triethylamine (165 ml) and DMAP (9.16 g, 75 mmol) were introduced to the solution and the mixture was stirred for 30 min at room temperature (25° C.). PPG-diol (Mn 2000), as specified above, (250 g, 125 mmol) was dissolved in DMF (100 ml) and added dropwise to the mixture over a period of 30 min. The mixture was stirred continuously at 80° C. for 48 hours, until complete conversion of hydroxyl groups of PPG-diol (Mn 2000), which was monitored by NMR. Then the reaction mixture was cooled at room temperature, diluted with dichloromethane and washed with an aqueous 1N HCl solution (thrice) followed by brine (twice), and finally with water (once). The organic phase was separated and concentrated to give the target product in 100% yield. $^1$H-NMR analysis confirmed the obtainment of the title product.

Example 5—Synthesis of a Polymer (P1E) of Formula with Mn 2192 and Ew 548 [herein after (P1E)].

Trimellitic anhydride (71.39 g, 371.61 mmol) and Fomblin ZDOL TX® PFPE (220 g, 123.87 mmol) were introduced in a flask under nitrogen atmosphere. The resulting mixture was heated to 170° C. and stirred for 3 hours using an overhead stirrer. Then, the reaction mixture was cooled to room temperature and dissolved in a mixture of acetone and HFX (1:1 ratio). The organic phase was separated and concentrated to give the target product in 100% yield.

Example 6—Synthesis of a Polymer (P2A) of Formula wherein Rs is a poly(dimethylsiloxane) chain, Mn 3278 [herein after (P2A)].

A glass reactor was charged with 2-chloro-4,6-diamino-1,3,5-triazine (14.553 g, 99.99 mmol), KHCO3 (10.033 g, 99.99 mmol), 2-propanol (300 mL) and water (150 mL) and the so obtained reaction mixture was warmed up to 70° C. P2F-1 (100 g, 33.33 mmol, Mn 3000) was added to the reaction mixture and stirred at 90° C. The completion of the reaction was monitored by $^1$H-NMR. The solvent was evaporated under reduced pressure and the polymer was purified by selective impurity precipitation in ethyl acetate solvent. All analyses confirmed the obtainment of the title product, with purity higher than 99%.

Example 7—Synthesis of a Polymer (P2B) of Formula wherein Rs is a poly(dimethylsiloxane) chain, Mn 5700 [herein after (P2B)].

A glass reactor was charged with 2-chloro-4,6-diamino-1,3,5-triazine (8.733 g, 60 mmol), KHCO$_3$ (6.006 g, 60 mmol), 2-propanol (150 mL) and water (20 mL). P2F-2 (100 g, 20 mmol, Mn 5000) was added to the reaction mixture and stirred at 90° C. The completion of the reaction was monitored by $^1$H-NMR. The solvent was evaporated under reduced pressure and the polymer was purified by selective impurity precipitation in ethyl acetate solvent. All analyses confirmed the obtainment of the title product, with purity higher than 99%.

Example 8—Synthesis of a Polymer (P2C) of Formula wherein Rs is a poly(dimethylsiloxane) chain, Mn 27400 [herein after (P2C)].

A glass reactor was charged with 2-chloro-4,6-diamino-1,3,5-triazine (2 g, 13.7 mmol), KHCO$_3$ (1.4 g, 13.7 mmol), 2-propanol (40 mL) and water (5 mL). P2F-3 (123 g, 4.6 mmol, Mn 27000) was added to the reaction mixture and stirred at 90° C. The completion of the reaction was monitored by $^1$H-NMR. The solvent was evaporated under reduced pressure and the polymer was purified by selective impurity precipitation in ethyl acetate solvent. All analyses confirmed the obtainment of the title product, with purity higher than 99%.

Example 9—Synthesis of a Polymer (P2D) of Formula with Mn 2206 [herein after (P2D)].

A glass reactor was charged with 2-chloro-4,6-diamino-1,3,5-triazine (21.83 g, 150 mmol) dispersed in a mixture of 2-propanol and water (450 ml, 2:1 v/v ratio). Poly(propyleneglycol)-bis(2-aminopropylether) (PPG-diamine) (100 g, 50 mmol) and K$_2$CO$_3$ (27.6 g, 200 mmol) were added to the mixture and stirred continuously at 90° C. for 48 hours. Then, the solvent was evaporated under reduced pressure and dissolved in toluene.

The insoluble material was filtered off and the filtrate was washed with water (twice). The organic phase was separated, filtered and concentrated to give the target product in 100% yield. $^1$H-NMR analysis confirmed the obtainment of the title product.

Example 10—Synthesis of a Polymer (P2E) of Formula with Mn 1800 and Ew 450 [herein after (P2E)], wherein: 95 mol. % of X is:

and 5 mol. % of X is:

Step 1: Synthesis of Fomblin® Z DOL PFPE Nonaflate of Formula:

A glass reactor was charged with triethylamine (TEA) (4.95 g, 49 meq), and perfluoro-1-butanesulfonyl fluoride (12.3 g, 40.8 meq) under mechanical stirring. The internal temperature of the reaction mass was lowered to −5/+5° C. using a dry ice bath. Fomblin® Z DOL PFPE (76 g, 45 mmol) was added drop-wise under vigorous stirring. Thereafter, the reaction mass was warmed up to room temperature, under mechanical stirring. The reaction was monitored by $^{19}$F-NMR. After 2 hours at room temperature, a sample was taken for $^{19}$F-NMR (conversion 70%). The internal temperature was increased up to 70° C. until completion of the reaction. After complete conversion, the reaction mixture was cooled to room temperature and the product was washed twice with ethanol (20 g per washing). An organic bottom phase formed, this phase was separated and the solvent was stripped at 70° C. under vacuum. Fomblin® Z DOL PFPE nonaflate (Mn=2300, Ew=1150) was isolated with a purity>95% and a yield>90%. PIs. correct.

Step 2: Reaction of Fomblin® Z DOL PFPE Nonaflate with a Diamine

A round bottom flask was charged with ethylene diamine (141.27 g, 2.35 mol) under nitrogen atmosphere. The PFPE-nonaflate obtained in step 1 above (100 g, 44 mmol) was dissolve din HFX (100 ml) and added dropwise (0.5 ml/min) to the round bottom flask containing the ethylene diamine. The resulting reaction mixture was stirred continuously at 25° C. for 6 hours, and then it was diluted with HFX and washed with water (thrice). The organic phase was separated and concentrated to give the polymer (P2E) as defined above in 100% yield.

Damping Properties

Table 1 reports the ingredients of samples C1 to C7 prepared following the procedure described above. The amounts of the respective ingredients is indicated in terms of equivalents. Samples C2-A, C2-B, C2-C contain the same ingredients and differ from each other for the amount of polymers P2A and P2F-1.

Samples C1, C2-A, C2-B are elastic solids, namely they have G'>G".

Samples C2-C, C3 are elastic jells, namely they have G'=G".

Samples C4, C5, C6, C7 are viscous fluids, namely they have G'<G".

TABLE 1

| | C1 | C2-A | C2-B | C2-C | C3 | C4 | C5 | C6 | C7 |
|---|---|---|---|---|---|---|---|---|---|
| P1A | 1.0 | 1.0 | 1.0 | 1.0 | | 1.0 | | | |
| P1B | | | | | 1.0 | | | | |
| P1C | | | | | | | 1.0 | | |
| P1D | | | | | | | | 1.0 | |
| P1E | | | | | | | | | 1.0 |
| P2A | 1.0 | 0.9 | 0.75 | 0.5 | | | | | |
| P2B | | | | | 1.0 | | | | |
| P2C | | | | | | | 1.0 | | |
| P2D | | | | | | | | 1.0 | |
| P2E | | | | | | | | | 1.0 |
| P2F-1 | | 0.1 | 0.25 | 0.5 | 1.0 | | | | |

Tables 2 to 6 below show a comparison in terms of damping properties between samples C1 to C7 (according to the invention) and commercial benchmarks having similar physical properties. In particular, Table 2 shows a comparison between elastic solids, Table 3 shows a comparison between elastic jells and Tables 4 to 6 show comparisons between viscous fluids.

Figure 1:
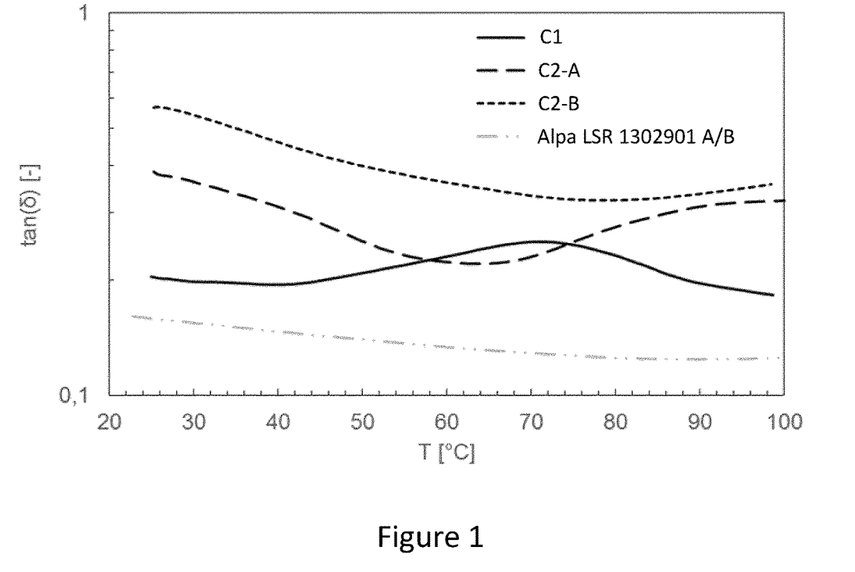
FIG. 1 is a graph sketching the tan(δ) as a function of the temperature (° C.) for samples C1, C2-A, C2-B compared to the tan(δ) profile of Alpa LSR 1302901 A/B which is used as comparative example.

Table 2 and FIG. 1 report the values of tan(δ) at 30° C., 60° C. and 90° C. of the samples C1, C2-A, C2-B (according to the invention) in comparison with those of the silicone elastomer Alpa LSR 1302901 A/B, which is used as a comparative example.

TABLE 2

|  | tan(δ) at 30° C. | tan(δ) at 60° C. | tan(δ) at 90° C. |
| --- | --- | --- | --- |
| C1 | 0.20 | 0.23 | 0.19 |
| C2-A | 0.36 | 0.22 | 0.30 |
| C2-B | 0.54 | 0.35 | 0.33 |
| Alpa LSR 1302901 A/B | 0.16 | 0.13 | 0.12 |

As evident from Table 2 and FIG. 1, the samples C1, C2-A, C2-B have higher values of tan(δ) at 30° C., 60° C. and 90° C. than Alpa LSR 1302901 A/B. This means that the samples according to the invention have more energy dissipation potential.

Figure 2:
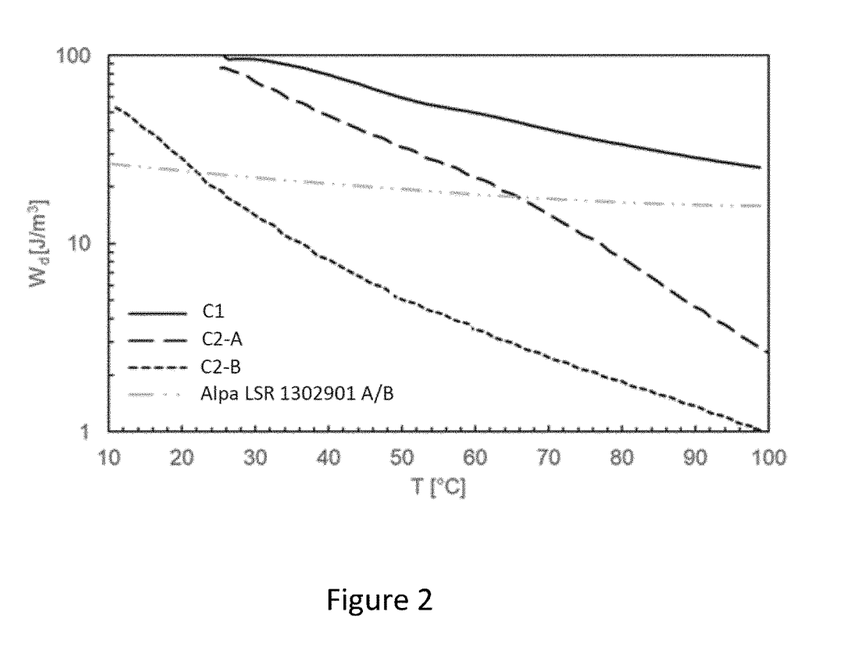
FIG. 2 is a graph sketching the dissipated energy per cycle ($W_d$) as a function of the temperature (° C.) for samples C1, C2-A, C2-B compared to the $W_d$ profile of Alpa LSR 1302901 NB which is used as comparative example.

Furthermore, it is noted from FIG. 2 that the sample C1 also has a higher dissipated energy per cycle ($W_d$) than Alpa LSR 1302901 A/B in the entire explored range of temperature, namely from about 25° C. to 100° C. Accordingly, the sample C1 has higher damping properties than Alpa LSR A/B in said entire range of temperature.

In addition, it is interestingly noted that the samples C2-A and C2-B, which comprise polymer (P2F-1) besides polymers (P1A) and (P2A), have a higher $W_d$ in a smaller temperature range. In particular, the sample C2-A has a higher $W_d$ in the temperature range from about 25° C. to about 70° C. and the sample C2-B has a higher $W_d$ in the temperature range from about 10° C. to about 25° C. This means that the polymer (P2F-1) can be suitably added to polymers (P1A) and (P2A) in order to tune the damping properties of the samples and, in particular, to have a higher $W_d$ than Alpa LSR 1302901 A/B specifically at a lower temperature, thus giving more flexibility in designing damping systems.

Figure 3:
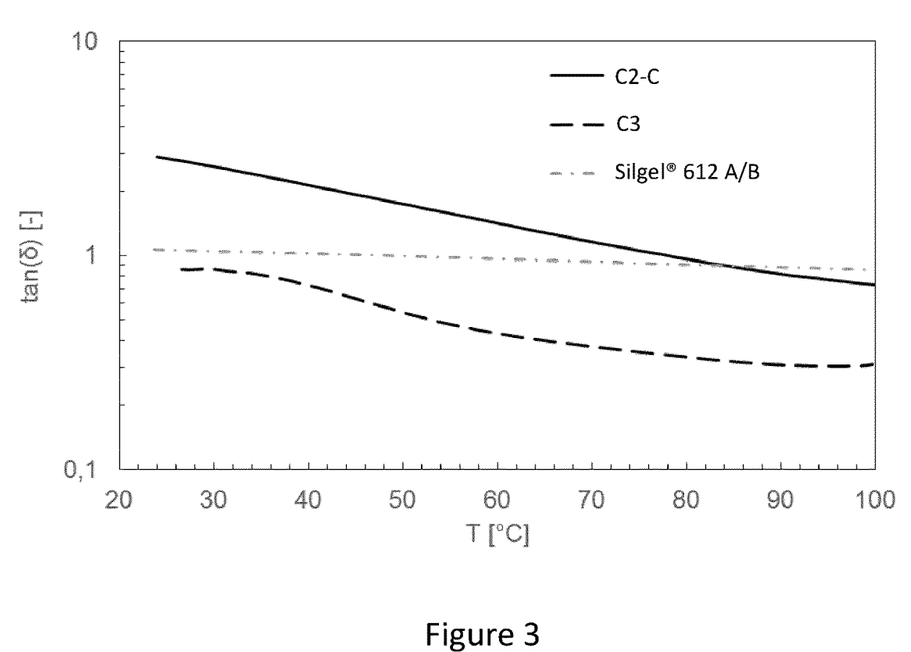
FIG. 3 is a graph sketching the tan(δ) as a function of the temperature (° C.) for samples C2-C, C3 compared to the tan(δ) profile of SilGel® 612 NB which is used as comparative example.

Table 3 and FIG. 3 report the values of tan(δ) at 30° C., 60° C. and 90° C. of the samples C2-C and C3 (according to the invention) in comparison with those of the silicone gel SilGel® 612 A/B, which is used as a comparative example.

TABLE 3

|  | tan(δ) at 30° C. | tan(δ) at 60° C. | tan(δ) at 90° C. |
| --- | --- | --- | --- |
| C2-C | 2.5 | 1.41 | 0.81 |
| C3 | 0.86 | 0.43 | 0.30 |
| SilGel® 612 A/B | 1.03 | 0.97 | 0.86 |

Figure 4:
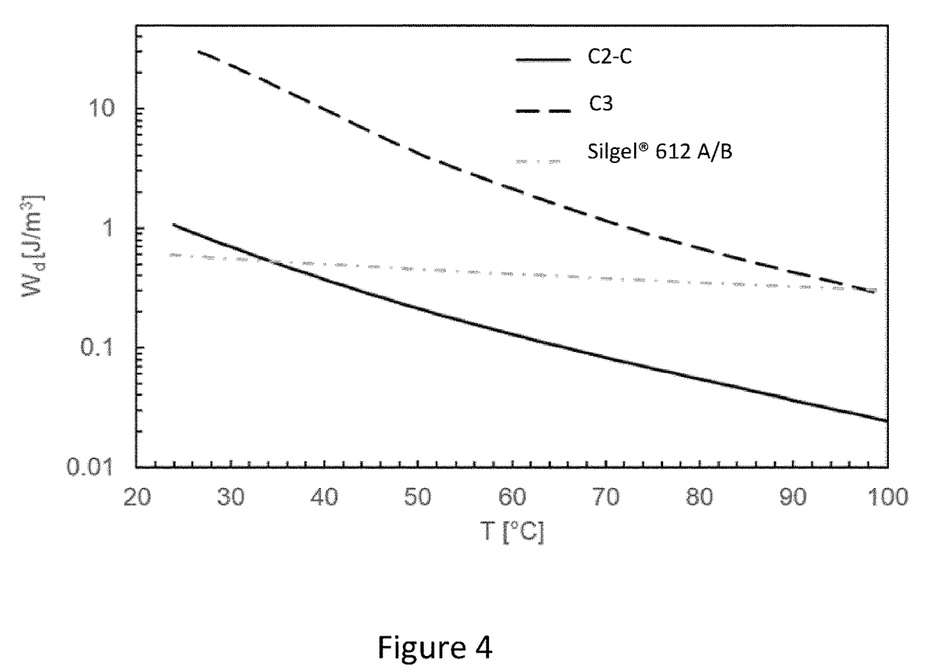
FIG. 4 is a graph sketching the dissipated energy per cycle ($W_d$) as a function of the temperature (° C.) for samples C2-C, C3 compared to the $W_d$ profile of SilGel® 612 NB which is used as comparative example.

As evident from Table 3 and FIG. 3, the sample C2-C has higher tan(δ) at 30° C. and 60° C., and substantially the same tan(δ) at 90° C. as SilGel® 612 A/B. Despite the sample C3 has lower values of tan(δ) at 30° C., 60° C. and 90° C. than SilGel® 612 A/B, its dissipated energy per cycle ($W_d$) is much higher than that of SilGel® 612 A/B in the entire explored temperature range, as evident from FIG. 4. Accordingly, the sample C3 according to the invention has improved damping properties than SilGel® 612 A/B.

Figure 5:
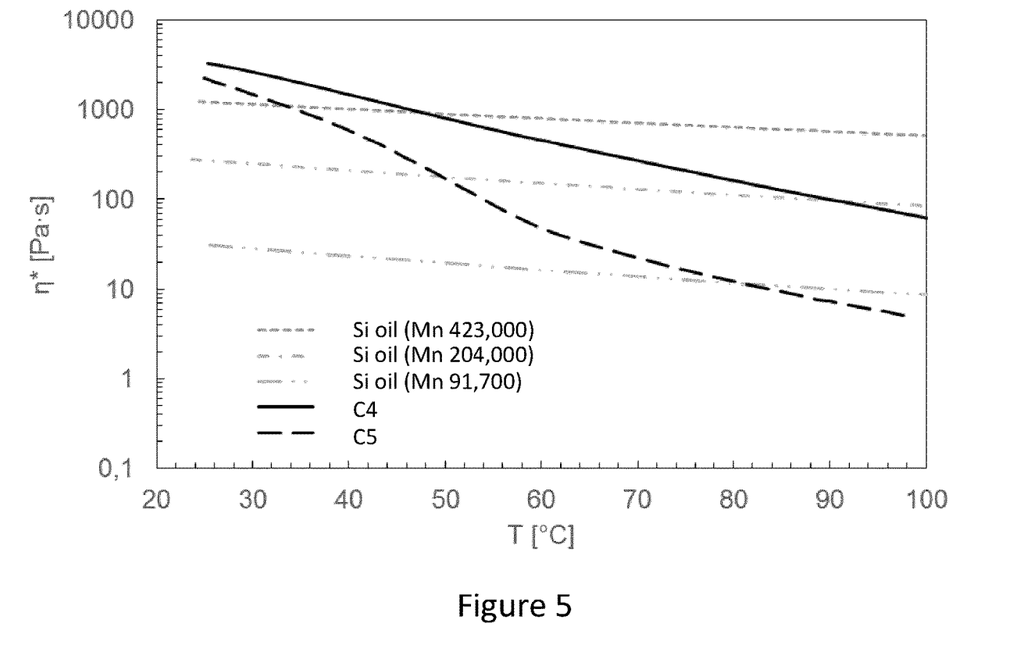
FIG. 5 is a graph sketching the complex viscosity (η*) as a function of the temperature (° C.) for samples C4, C5 compared to the η* profiles of trimethylsiloxy terminated polydimethylsiloxanes having different molecular weights, which are used as comparative examples.

Table 4 and FIG. 5 report the values of complex viscosity (η*) at 30° C., 60° C. and 90° C. of the samples C4 and C5 (according to the invention) in comparison with those of trimethylsiloxy terminated polydimethylsiloxanes with Mn=423'000, Mn=204'000 and Mn=91'700 respectively, which are silicone oils used as comparative examples.

TABLE 4

|  | η* at 30° C. [Pa · s] | η* at 60° C. [Pa · s] | η* at 90° C. [Pa · s] |
| --- | --- | --- | --- |
| C4 | 2663 | 461 | 101 |
| C5 | 1508 | 46.4 | 7.4 |
| Si oil (Mn 423,000) | 1162 | 809 | 572 |
| Si oil (Mn 204,000) | 247 | 151 | 97 |
| Si oil (Mn 91,700) | 28.6 | 16.2 | 10.1 |

As evident from Table 4 and FIG. 5, the samples C4 and C5 have higher η* at 30° C. than the silicone oils used as counterexamples. In addition, the sample C4 has higher η* at 60° C. and 90° C. than silicone oils with Mn 204,000 and 91,700.

Surprisingly, it has been found that the samples C4 and C5 ensure better damping performances at 30° C. than silicone oils having a much higher Mn, even than the silicone oil having Mn 423,000 which is one or two orders of magnitude greater.

Accordingly, high η* and high damping properties can be obtained without the need of synthesizing polymers with very high molecular weights. In other words, high η* and high damping properties can be obtained by using polymers having lower Mn, therefore without the need of forcing the polymerization towards very high molecular weights, which has many drawbacks as outlined above in the background art.

Figure 6:
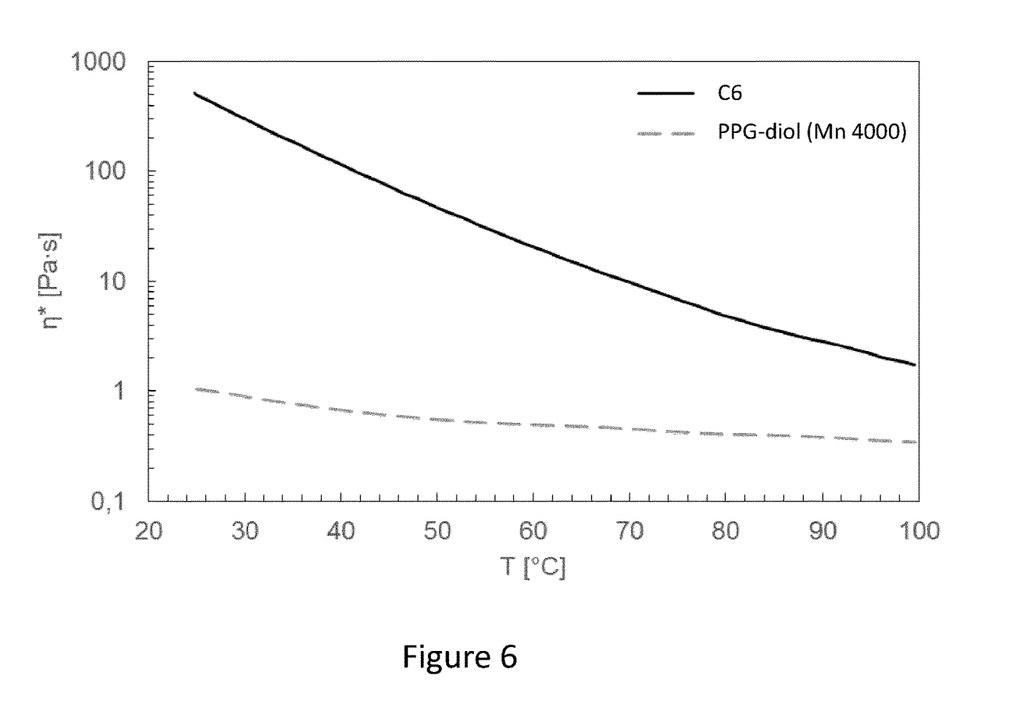
FIG. 6 is a graph sketching the complex viscosity (η*) as a function of the temperature (° C.) for sample C6 compared to the η* profile of poly(propyleneglycol) (Mn 4000) which is used as comparative example.

Table 5 and FIG. 6 report the values of complex viscosity (η*) at 30° C., 60° C. and 90° C. of the sample C6 (according to the invention) in comparison with PPG-diol (Mn 4000) which is used as a comparative example.

TABLE 5

|  | η* at 30° C. [Pa · s] | η* at 60° C. [Pa · s] | η* at 90° C. [Pa · s] |
| --- | --- | --- | --- |
| C6 | 295.1 | 20.3 | 2.9 |
| PPG-diol (Mn 4000) | 0.9 | 0.5 | 0.4 |

Table 5 above and FIG. 6 show that the sample C6 has higher η* at 30° C., 60° C. and 90° C. than PPG-diol (Mn 4000). It is particularly noted that the sample C6 has η* at 30° C. which is even three orders of magnitude higher than that of the reference PPG-diol (Mn 4000). Accordingly, the sample C6 of the invention has significantly improved damping properties with respect to PPG-diol (Mn 4000).

Figure 7:
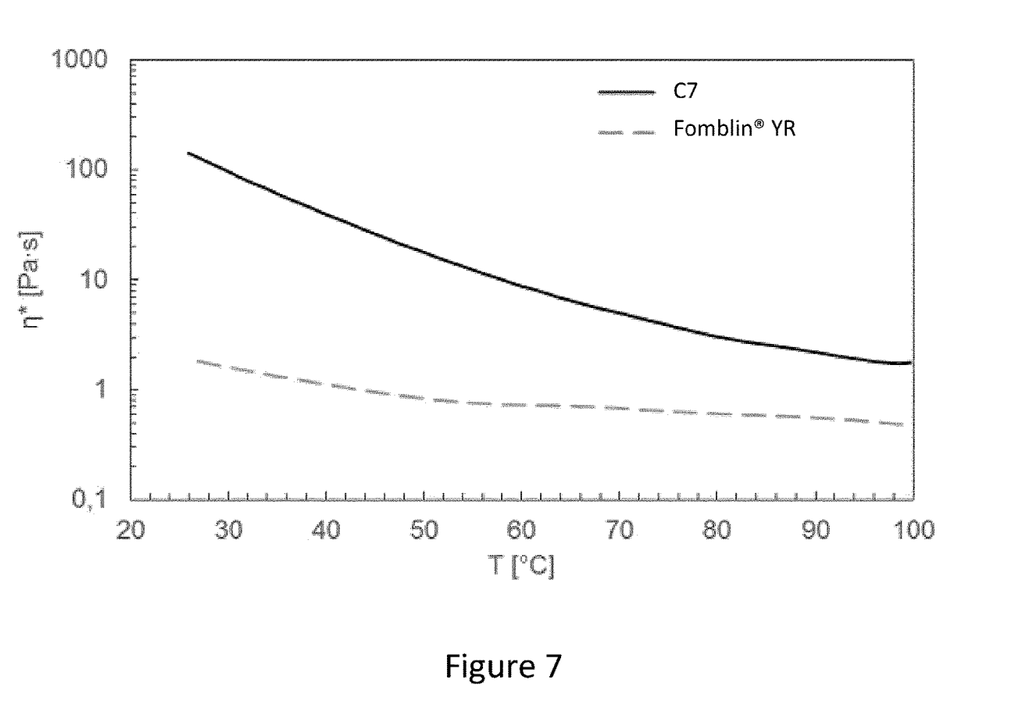
FIG. 7 is a graph sketching the complex viscosity (η*) as a function of the temperature (° C.) for sample C7 compared to the η* profile of Fomblin® YR which is used as comparative example.

Table 6 and FIG. 7 report the values of complex viscosity (η*) at 30° C., 60° C. and 90° C. of the sample C7 (according to the invention) in comparison with Fomblin® YR, which is used as a comparative example.

TABLE 6

|  | η* at 30° C. [Pa · s] | η* at 60° C. [Pa · s] | η* at 90° C. [Pa · s] |
| --- | --- | --- | --- |
| C7 | 96.2 | 8.9 | 2.2 |
| Fomblin® YR | 1.7 | 0.7 | 0.5 |

The data reported in Table 6 above and FIG. 7 demonstrate that the sample C7 has higher η* at 30° C., 60° C. and 90° C. than Fomblin® YR and, accordingly, improved damping properties in a broad temperature range.

The invention claimed is:

1. A method for attenuating vibrations and/or shocks, said method comprising:
providing a damper assembly, said damper assembly comprising at least one moving part and at least one supramolecular polymer in contact with said at least one moving part, said supramolecular polymer being obtained by reacting:
a) at least one first polymer [polymer (P1)] comprising a polymer chain [chain (R)] consisting of a plurality of non-ionisable recurring units [units (U)], said polymer (P1) having two chain ends (E1, E1'), each end comprising at least one ionisable acid group;
b) at least one second polymer [polymer (P2)] comprising a polymer chain [chain (R)] consisting of a plurality of recurring units [units (U)], said chain (R) being equal to or different from that of polymer (P1), and said polymer (P2) having two chain ends (E2, E2'), each end comprising at least one ionisable amino group, and
exposing said at least one moving part to said vibrations and/or shocks, so as to attenuate the same.

2. The method according to claim 1, wherein said damper assembly is selected from the group comprising: dash pots; shock absorbers rotary dampers; tuned mass dampers; viscous couplings; viscous fan clutches and torsional viscous dampers.

3. The method according to claim 1, wherein polymer (P1) and polymer (P2) are amorphous and have a $T_g$ lower than $-35°$ C.

4. The method according to claim 1, wherein the chain ends (E1, E1') of polymer (P1), equal to or different from each other, comply with the following formula (E1-A):

$$-B1-(E_A)_m \qquad (E1\text{-}A)$$

wherein:
EA represents a —COOH, a —P(O)(OR$_{EA}$)$_2$ or a —S(O)$_2$OH group, wherein one of R$_{EA}$ is hydrogen and the other one is hydrogen or straight or branched alkyl, preferably C$_1$-C$_4$ alkyl;
m is a positive number equal to or higher than 1;
B1 is a hydrocarbon group preferably comprising from 1 to 20 carbon atoms and optionally comprising one or more than one heteroatom, said heteroatom(s) being preferably selected among N, S and O.

5. The method according to claim 1, wherein the chain ends (E2, E2') of polymer (P2), equal to or different from each other, comply with the following formula (E2-A):

$$-B2-(N(R_{P2})_2)_p \qquad (E2\text{-}A)$$

wherein:
each of R$_{P2}$, equal to or different from each other at each occurrence, is hydrogen or straight or branched alkyl, preferably C$_1$-C$_4$ alkyl;
p is a positive number equal to or higher than 1; and
B2 is a hydrocarbon group, which optionally comprises one or more than one heteroatom.

6. The method according to claim 1, wherein the chain (R) of polymer (P1) and/or polymer (P2) is a polyalkylsiloxane chain [chain (R$_S$)] comprising recurring units [units (U$_S$)], equal to or different from each other, of formula:

(U$_s$)

wherein Ra$_s$ and Rb$_s$, equal to or different from one another, are independently selected from hydrogen, straight or branched (halo)alkyl and aryl, with the proviso that at least one of Ra$_s$ and Rb$_s$ is not hydrogen, and
Ra$_s$ and Rb$_s$ being preferably straight or branched alkyl groups comprising from 1 to 4 carbon atoms.

7. The method according to claim 6, wherein said chain (R$_S$) has formula (R$_S$-I):

$$\text{Si}(CH_3)_2O[\text{Si}(CH_3)_2O]_{ns}\text{Si}(CH_3)_2 \qquad (R_S\text{-}I)$$

with ns being a positive number selected in such a way that the number average molecular weight (M$_n$) of the [Si(CH$_3$)$_2$O]$_{ns}$ chain ranges from 500 to 50'000.

8. The method according to claim 6, wherein polymer (P1) complies with formula (P$_S$1-A):

$$R_S-[(CH_2)_{ns^*}\text{NHC}(O)-R_{B1}-(COOH)_2]_2 \qquad (P_S1\text{-}A)$$

wherein:
ns* is 0 or a positive number equal to or higher than 1, and
R$_{B1}$ is a C$_1$-C$_{10}$ straight or branched aliphatic group, a C$_4$-C$_6$ alicyclic group or heterocyclic group, a C$_5$-C$_6$ aromatic group or heteroaromatic group,
and/or polymer (P2) complies with formula (P$_S$2-A):

$$R_S-[(CH_2)_{ns^*}\text{NH}-R_{B2}-(N(R_{P2})_2)_2]_2 \qquad (P_S2\text{-}A)$$

wherein:
ns* is 0 or a positive number equal to or higher than 1;
R$_{B2}$ is a C$_1$-C$_{10}$ straight or branched aliphatic group, a C$_4$-C$_6$ alicyclic group or heterocyclic group, a C$_5$-C$_6$ aromatic group or heteroaromatic group, R$_{B2}$ being preferably a triazine, more preferably a 1,3,5-triazine.

9. The method according to claim 1, wherein the chain (R) of polymer (P1) and/or polymer (P2) is a polyoxyalkylene chain [chain (R$_{OA}$)] comprising recurring units [units (U$_{OA}$)], equal to or different from each other, of formula:

$$-OR^*_{OA}- \qquad (U_{OA})$$

wherein R*$_{OA}$ is a straight or branched alkylene divalent group.

10. The method according to claim 9, wherein said chain (R$_{OA}$) has a number average molecular weight (M$_n$) ranging from 500 to 10'000.

11. The method according to claim 9, wherein polymer (P1) complies with the following formula (P$_{OA}$1-B):

$$(HOOC)_2R_{B1}-C(O)-(OR^*_{OA})_{n^*OA}-O-C(O)-R_{B1}(COOH)_2 \qquad (P_{OA}1\text{-}B)$$

wherein:
R$_{B1}$ is a C$_1$-C$_{10}$ straight or branched aliphatic group, a C$_4$-C$_6$ alicyclic group or heterocyclic group, a C$_5$-C$_6$ aromatic group or heteroaromatic group, and
n*$_{OA}$ is a positive number selected in such a way that the number average molecular weight (M$_n$) of the chain R$_{OA}$ ranges from 500 to 10'000,
and/or polymer (P2) complies with the following formula (P$_{OA}$2-B):

$$((R_{P2})_2N)_2R_{B2}-NH-(OR^*_{OA})_{n^*OA}-R^*_{OA}-NH-R_{B2}(N(R_{P2})_2)_2 \qquad (P_{OA}2\text{-}B)$$

wherein:
R$_{B2}$ is a C$_1$-C$_{10}$ straight or branched aliphatic group, a C$_4$-C$_6$ alicyclic group or heterocyclic group, a C$_5$-C$_6$ aromatic group or heteroaromatic group; and
n*$_{OA}$ is a positive number selected in such a way that the number average molecular weight (M$_n$) of the chain R$_{OA}$ ranges from 500 to 10'000.

12. The method according to claim 1, wherein the chain (R) of polymer (P1) and/or polymer (P2) is a fully or partially fluorinated polyoxyalkylene chain [chain ($R_F$)] comprising recurring units [units ($U_F$)] selected among:

($U_F$-i) —CFXO—, wherein X is F or $CF_3$;

($U_F$-ii) —CFXCFXO—, wherein X, equal or different at each occurrence, is F or $CF_3$, with the proviso that at least one of X is —F;

($U_F$-iii) —$CF_2CF_2CW_2O$—, wherein each of W, equal or different from each other, is F, Cl, H;

($U_F$-iv) —$CF_2CF_2CF_2CF_2O$—;

($U_F$-v) —$(CF_2)_j$—CFZ—O— wherein j is an integer from 0 to 3 and Z is a group of general formula —$OR_f$*T, wherein $R_f$* is a fluoropolyoxyalkene chain comprising a number of repeating units from 0 to 10, said recurring units being chosen among the followings: —CFXO—, —$CF_2CFXO$—, —$CF_2CF_2CF_2O$—, —$CF_2CF_2CF_2CF_2O$—, with each of each of X being independently F or $CF_3$ and T being a $C_1$-$C_3$ perfluoroalkyl group.

13. The method according to claim 12, wherein said chain ($R_F$) has formula ($R_F$-I):

(R$_F$-I)

wherein:

$X_1$ is independently selected from —F and —$CF_3$;

$X_2$, $X_3$, equal or different from each other and at each occurrence, are independently —F, —$CF_3$, with the proviso that at least one of X is —F;

g1, g2, g3, and g4, equal or different from each other, are independently integers≥0, selected in such a way as the average number molecular weight ($M_n$) ranges from 400 to 10'000; should at least two of g1, g2, g3 and g4 be different from zero, the different recurring units are generally statistically distributed along the chain.

14. The method according to claim 13, wherein polymer (P1) is selected from a polymer complying with any of the following formulae ($P_F$1-A) to ($P_F$1-C):

($R_F$-I)-[CFXCH$_2$(OCH$_2$CH$_2$)$_{nD}$OCH$_2$COOH]$_2$      ($P_F$1-A)

($R_F$-I)-[CFXCH$_2$(OCH$_2$CH$_2$)$_{nD}$OC(O)—R$_{B1}$—COOH]$_2$      ($P_F$1-B)

($R_F$-I)-[CFXCH$_2$(OCH$_2$CH$_2$)$_{nD}$NHC(O)—R$_{B1}$—COOH]$_2$      ($P_F$1-C)

and/or polymer (P2) is selected from a polymer complying with any of the following formulae ($P_F$2-A) to ($P_F$2-D):

($R_F$-I)-[CFXCH$_2$(OCH$_2$CH$_2$)$_{nD}$N(R$_{P2}$)$_2$]$_2$      ($P_F$2-A)

($R_F$-I)-[CFXCH$_2$(OCH$_2$CH$_2$)$_{nD}$NH—R$_{B2}$—N(R$_{P2}$)$_2$]$_2$      ($P_F$2-B)

($R_F$-I)-[CFXCH$_2$(OCH$_2$CH$_2$)$_{nD}$OC(O)—R$_{B2}$—N(R$_{P2}$)$_2$]$_2$      ($P_F$2-C)

($R_F$-I)-[CFXCH$_2$(OCH$_2$CH$_2$)$_{nD}$OC(O)NH—R$_{B2}$NHC(O)OR$_{B3}$—N(R$_{P2}$)$_2$]$_2$      ($P_F$2-D)

wherein:

nD is 0 or an integer≥1, $R_{B1}$ is a $C_1$-$C_{10}$ straight or branched aliphatic group, a $C_4$-$C_6$ alicyclic group or heterocyclic group, a $C_5$-$C_6$ aromatic group or heteroaromatic group, optionally comprising one or more —COOH groups, $R_{B2}$ is a $C_1$-$C_{10}$ straight or branched aliphatic group, a $C_4$-$C_6$ alicyclic group or heterocyclic group, a $C_5$-$C_6$ aromatic group or heteroaromatic group, and $R_{B3}$ is a $C_2$-$C_{10}$ straight or branched aliphatic group, optionally interrupted by one or more —N(R$_{P2*}$)— groups wherein R$_{P2*}$ represents hydrogen or straight or branched alkyl.

15. A damper assembly comprising at least one moving part and at least one supramolecular polymer in contact with said at least one moving part, wherein said supramolecular polymer is obtained by reacting:

a) at least one first polymer [polymer (P1)] comprising a polymer chain [chain (R)] consisting of a plurality of non-ionisable recurring units [units (U)], said polymer (P1) having two chain ends (E1, E1'), each end comprising at least one ionisable acid group; and b) at least one second polymer [polymer (P2)] comprising a polymer chain [chain (R)] consisting of a plurality of recurring units [units (U)], said chain (R) being equal to or different from that of polymer (P1), and said polymer (P2) having two chain ends (E2, E2'), each end comprising at least one ionisable amino group.

* * * * *